United States Patent Office 3,297,465
Patented Jan. 10, 1967

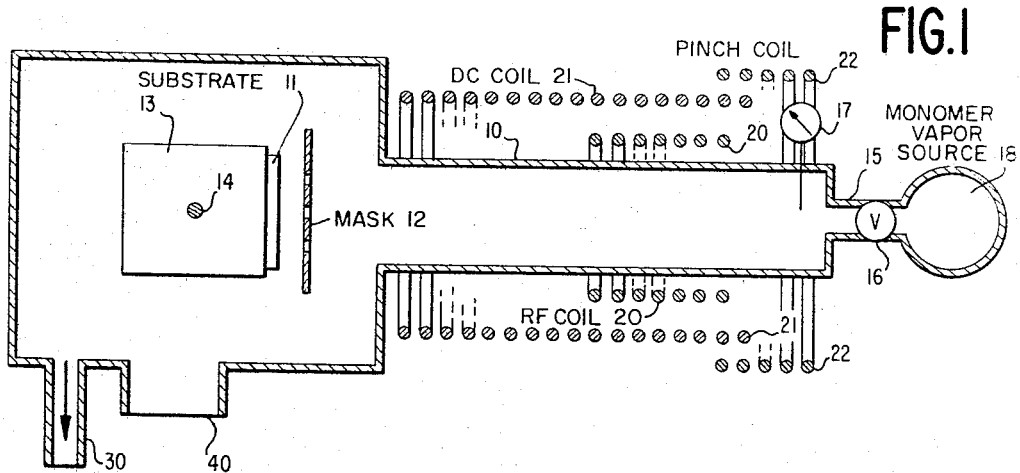
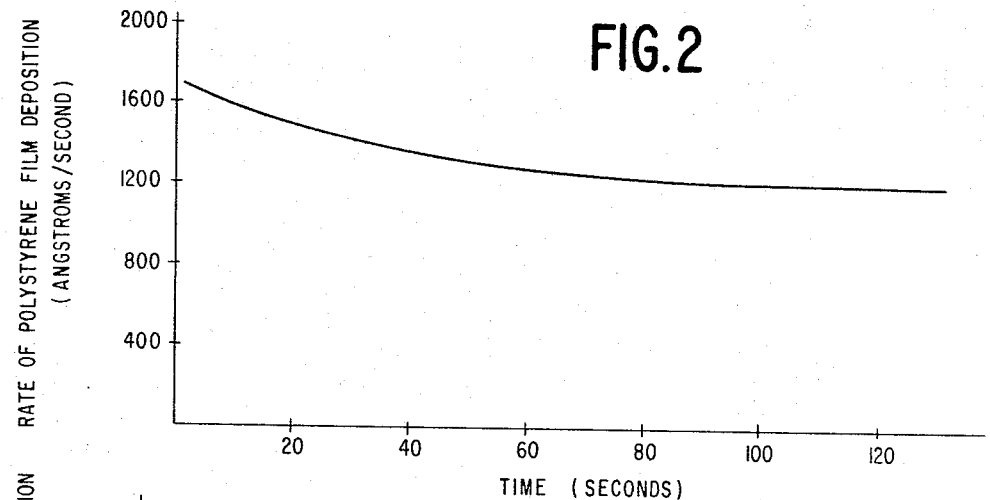
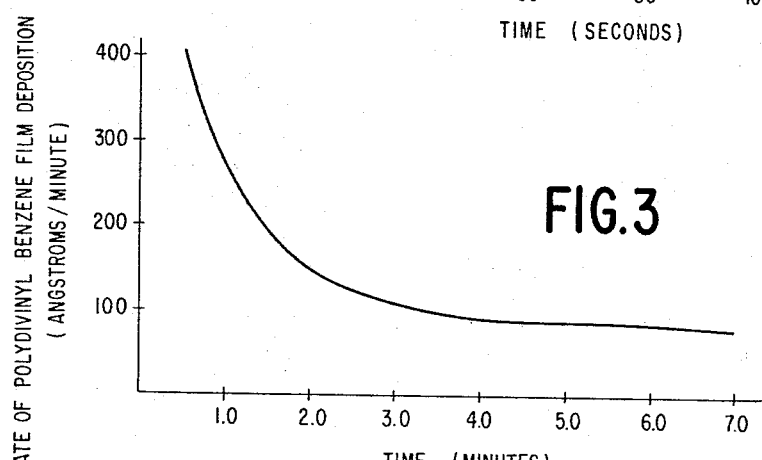
INVENTORS
RICHARD A. CONNELL
LAWRENCE V. GREGOR
BY
*Hughes, Rothwell, Mion & Zinn*
ATTORNEYS

3,297,465
METHOD FOR PRODUCING ORGANIC PLASMA
AND FOR DEPOSITING POLYMER FILMS
Richard A. Connell, Shawnee Mission, Kans., and Lawrence V. Gregor, Briarcliff Manor, N.Y., assignors to International Business Machines Corporation, New York, N.Y., a corporation of New York
Filed Dec. 31, 1963, Ser. No. 334,721
17 Claims. (Cl. 117—38)

The present invention relates to a method and apparatus for producing a gaseous plasma containing organic ions and molecules and for depositing homogeneous films of polymers from such a plasma. More specifically, the present invention relates to methods and apparatus for producing homogeneous polymer films of controlled thickness and dimensions by deposition from a specially formed plasma source.

It is well known that various chemical reactions may be initiated by means of an energy discharge. For example, polymerization reactions may be conducted by energy discharge in an atmosphere containing monomer vapors. Energy discharge has also been employed in chemical plasma reactors for the synthesis of various compounds. Related procedures involve the use of electron beams to polymerize organic vapors which are adsorbed on substrates thereby forming insulating films.

The source of the energy discharge used in such processes is ordinarily an electric arc struck between two electrodes so as to form a plasma with the organic vapors. The plasma thus formed cannot be precisely defined but it is generally believed to comprise a mixture of electrons and gaseous monomer ions, free radicals and various charged molecular fragments, with or without neutral atoms. This plasma is then ordinarily directed onto a suitable substrate. The substrate conventionally is an electrically charged element which attracts the electrons and ions in the plasma. The excited organic constituents of the plasma then condense and polymerize on the surface of the target forming thin insulating films. It is also common practice to direct the plasma through a template, screen or mask to control the areas of the substrate on which the polymer film is deposited.

In the course of operating conventional systems of the type described, certain problems have been encountered which render the various techniques somewhat unsatisfactory.

According to known discharge polymerization methods, a relatively large energy input and a high monomer pressure must be maintained in order to produce satisfactory discharge and plasma production. As a result, a considerable amount of polymer deposition occurs at random on the walls of the reaction chamber and elsewhere in the system, not on the substrate.

Also, as a result of the high energy input and monomer pressure, the entire system including the substrate frequently is heated to temperatures at which degradation or pyrolysis of the monomer or polymer occurs. As a consequence, the films deposited by such techniques have not been uniform in their chemical or physical properties. Nor has the polymer film had the composition that would be expected from the polymerization of the starting monomer.

Where arcing of electrodes in the atmosphere containing monomer vapors has been used as the energy source for plasma formation, undesirable spattering, sputtering and local arcing have been experienced.

A further disadvantage of prior techniques requiring high monomer pressures to sustain a useful plasma formation has been the incompatibility of such systems with the requirements of vacuum deposition. A major use of thin polymer films of the type in question has been in the production of dielectric layers in thin film capacitors. The electrodes of such devices are frequently formed by vacuum deposition of the electrode metal directly onto the dielectric layer. It is highly desirable, therefore, to have compatible methods for depositing dielectric and electrode films so that the methods can be operated alternately with ease and efficiency, and preferable in an integrated system, to build up a multi-layer device.

However, if high monomer pressures are required, as they are in conventional plasma polymerization systems, a great deal of pumping is required to prepare the chamber for a subsequent vacuum deposition.

Also, in the plasma deposition devices currently in use, the substrate or target is ordinarily an electrode in the system. This too may result in overheating of the substrate and adversely affect the homogeneous character and properties of the polymer film.

Where masks or templates are interposed between the plasma source and the substrate, a problem referred to as "shadowing" has also been encountered. Shadowing refers to the deposition of the polymer film on areas of the substrate intended to be screened or masked by the template. This results from diffusion of monomer ions within the space between the template and the substrate and the deposition of polymer film on portions of the substrate where film formation is not desired and is found in most conventional processes.

Accordingly, it is an object of the present invention to provide a new method and apparatus for producing plasma for the deposition of polymer films and for controlling the deposition to produce homogeneous films of reproducible chemical and physical properties.

A further object of the present invention is to provide a method and apparatus for depositing polymer films from a plasma source which enables the dimensions of the film to be controlled closely with respect to thickness and area and which avoids the problem of "shadowing" when a template or mask is employed.

A further object of the present invention is to provide an improved method and apparatus for depositing polymer films from a plasma source without sputtering, spattering, local arcing and similar undesirable effects.

An additional object of the invention is to provide a method for producing a plasma source and depositing polymer films from the plasma at high rates of deposition to produce a film of high homogeneity.

The manner in which the above objects and many other highly desirable advantages are achieved according to this invention will be more fully appreciated in view of the following detailed description of the invention considered with reference to the accompanying drawing.

In the drawing,

FIGURE 1 is a partially schematic, cross-sectional view of a preferred system of apparatus in accordance with the invention, FIGURE 2 is a graph showing the plot of the rate of deposition of polystyrene according to the invention, and FIGURE 3 is a graph showing the plot of the rate of deposition of polyvinylbenzene according to the invention.

In general, the present invention comprises a novel method for producing polymer films by glow discharge in a gas containing monomer vapors followed by condensation of the resulting plasma onto a substrate in the form of a film of the polymer. According to the invention, a glow discharge in monomer vapors maintained at a low pressure is triggered by exciting the monomer with a combination of magnetic and electric energy.

In practice, a low electromagnetic energy input derived from a radio-frequency coil is combined with a magnetic field to sustain a glow discharge in the monomer vapors. The plasma formed in this manner is then contacted with a substrate on which the excited monomer ions, free radicals and molecules condense and polymerize as a homogeneous film.

The invention also comprises in another embodiment the use of a second magnetic field to propel the plasma into contact with the substrate.

The methods and apparatus of the present invention have wide utility in the coating arts and are especially useful in depositing thin insulating polymer films of uniform thickness and accurately determined dimensions. Such methods may be employed in the production of thin film electrical devices, such as capacitors, where the thin metal films or plates may be deposited by gas plating techniques.

The methods and apparatus of the present invention may be utilized to form polymer films from a wide variety of monomers and mixtures of monomers, including, for example, styrene, divinylbenzene, butadiene, glycidyl methacrylate, allyl glycidyl, alkylenes, such as ethylene and propylene, epoxy monomers, etc.

A preferred system of apparatus in accordance with the present invention is shown somewhat schematically in side cross-sectional view in FIGURE 1 of the drawing. Referring to FIGURE 1, it will be seen that the apparatus comprises a reaction chamber 10 in which is mounted a substrate 11 and mask 12 which together are referred to as the target.

An inlet 15 is provided at one end of the reaction chamber for admitting monomer vapors into the chamber. The admission of monomer vapors through inlet 15 is preferably controlled by a needle valve 16. A thermocouple gauge 17 may be provided adjacent to the gas inlet in order to monitor the monomer pressure at the inlet end of the system. Valve 16 communicates with a suitable source of monomer vapors 18.

A portion of reaction chamber 10 is surrounded by a radio-frequency coil 20 which may be energized by any conventional variable radio-frequency source, not shown.

A second coil 21 surrounds a major portion of the reaction chamber 10 including most of the region from the radio-frequency coil 20 to the substrate 11. Coil 21 is connected to a suitable source of direct current, not shown.

In operation of the system, needle valve 16 is actuated so as to admit monomer vapors to maintain a controlled low pressure of monomer within the system.

Coils 20 and 21 are both energized and the combination of the electromagnetic energy generated by the radio-frequency energy input and the magnetic field produces a controlled, sustained glow discharge in chamber 10. The D.C. magnetic field generated by coil 21 also has the effect of confining the plasma in a region axial to coils 21 and 20 and generally perpendicular to the surface of substrate 11.

The confining effect of the magnetic field produced by coil 21 thus minimizes random deposition on the walls of the chamber and enhances deposition on the surface of substrate 11.

It is theorized that the collimating or confining effect of the magnetic field increases the number of useful collisions between particles in the plasma and thereby enables the glow discharge to be sustained with the low energy input of radio-frequency coil 20.

The system may be connected with a vacuum pump, not shown, through outlet 30 to maintain a slight pressure gradient within the system. This also assists the diffusion of the plasma in the direction of the substrate.

Substrate 11 is preferably mounted on a water cooled metal block 13. Block 13 may be pivotable on shaft 14 so that the substrate may be pointed towards port 40 through which it may be exposed to a vacuum deposition operation after the polymer deposition is completed. Block 13 may be of copper or another metal having good thermal conductivity and may be cooled by the internal circulation of water or other cooling fluid. Similarly, coils 20 and 21 may be cooled by water.

In one embodiment of the invention, a pinch coil 22 may be provided surrounding the reaction chamber. Pinch coil 22 is connected with a suitable source of direct current, not shown, to provide a secondary, localized magnetic field which preferably is positioned on the side of the plasma formation zone away from the substrate.

The magnetic field produced by coil 22 reinforces locally the magnetic field generated by coil 21 so that the combined magnetic field effect is greater in the region of coil 22 than elsewhere along the axis of coil 21. This produces a pinching or squeezing effect on the plasma generated in the chamber and tends to propel it towards substrate 11.

In order to deposit polymer films with this apparatus, monomer vapors are admitted from source 18 by manipulation of valve 16 to produce at the inlet end of chamber 10 a low vapor pressure of up to about 200 microns, depending on the monomer being used. A thermocouple gauge 17 or other means for measuring the vapor pressure at the inlet system may be used, so that the amount of monomer admitted through valve 16 may be maintained at the desired level.

While the precise temperature of the system is not critical to the invention, a temperature in the reaction chamber in the range of from about 0° to 30° C. is satisfactory for most polymer depositions.

The system is pumped out through line 30 so that the pressure at the outlet end of the system is on the order of from about 10 to 20 microns. The evacuation thus maintains a slight pressure gradient in the system which also tends to assist the diffusion of the plasma towards the target area. This pressure gradient maintains a flow rate of a few cubic centimeters per second of monomer vapor through the plasma formation zone.

When the desired monomer vapor pressure has been established in chamber 10 as indicated by thermocouple gauge 17, a glow discharge is initiated by energizing coil 20 with radio-frequency energy and by passing direct current through coil 21.

The electromagetic field of radio-frequency coil 21 and the magnetic field of coil 21 are sufficient to trigger the glow discharge at a relatively low energy input.

It is important to note that the D.C. magnetic field of coil 21 also tends to collimate or confine the plasma particles along the axis of the coil, i.e., along a line substantially perpendicular to the surface of the substrate. The magnetic field also extends close to the surface of the substrate, so that control of the diffusion of the plasma particles is realized throughout the major part of the chamber.

Coil 20 is connected with a suitable source of radio-frequency electric energy. Coil 20 may be operated at frequencies of from 100 kilocycles to 1 megacycle per second, so as to generate a peak magnetic field component of about 2 oersteds.

The solenoid 21 may be connected to any suitable D.C. power supply and is operated to generate peak magnetic fields of up to about 1000 oersteds. Stronger magnetic field strengths may be used, but there is a practical limit on the strength of magnetic fields that can be generated by a solenoid, such as coil 21, without undue heating. Even at field strengths of from 400 to 500 oersteds, it is desirable to cool the solenoid coil.

In general, a magnetic field strength of 300 oersteds or greater is sufficient to trigger the glow discharge in combination with the radio-frequency electromagnetic field.

It is also possible to employ permanent magnets in place of solenoids 21 and 22 to provide the required magnetic field effect to form and to confine the plasma.

Where a pinch coil 22 is employed, it is also connected to a suitable source of D.C. current. The solenoid may be operated to generate a magnetic field of several hundred oersteds. This field in combination with the field produced by coil 21 provides a higher magnetic field in the vicinity of coil 22 and this aids the diffusion of the plasma towards the substrate.

The invention will be more fully understood with reference to the following detailed examples.

*Example 1*

Monomeric styrene vapors are introduced into an apparatus of this type from source 18 through valve 16 into chamber 10. The temperature in the chamber is maintained at about 25° C. and a monomer pressure of about 160 microns is established at the inlet end of chamber 10. Radio-frequency coil 20 is then energized and is operated at a frequency of about 400 kilocycles per second to generate a peak magnetic field component of about 2 oersteds. A current of 0.4 amps and 10 volts in coil 20 will provide about 4 watts of radio-frequency power in the chamber adjacent to the coil. Solenoid 21 is simultaneously energized and is operated to generate a magnetic field of about 500 oersteds.

The combined field of coils 20 and 21 when energized, triggers and sustains a glow discharge which is visible in chamber 10. The plasma then diffuses into contact with substrate 11 in chamber 10 resulting in the deposition of a thin polystyrene film on the substrate.

Referring to FIGURE 2 of the drawing, it will be seen that extremely high rates of polystyrene film deposition are obtained by this method. Of course, films of any desired thickness may be built up by controlling the length of time that the substrate is exposed to the plasma.

*Example 2*

Divinylbenzene monomer vapors are introduced into chamber 10 to produce a monomer vapor pressure of about 50 microns at the inlet end of chamber 10. Radio-frequency coil 20 is energized to generate a peak magnetic field component of about 1 oersted. Solenoid 21 is operated to provide a field strength of about 300 oersteds. The temperature of the system is maintained at 25° C. by cooling copper block 13 and by cooling coils 20 and 21.

The plot of the rate of deposition of polydivinylbenzene, as conducted according to Example 2, is shown in FIGURE 3 of the drawing.

*Example 3*

Polymer deposition is carried out as in Example 2, but an additional collimating or pinch coil 22 is operated during the deposition to provide a secondary magnetic field having a field strength of about 150 oersteds.

It will be apparent from the foregoing examples that other monomers may be converted to plasma and deposited as polymeric films by proceeding in a similar manner.

In general, a monomer pressure of up to about 200 microns and preferably from about 20 to 200 microns is satisfactory in the present process. With a monomer vapor pressure in the indicated range, a magnetic field strength of about 300 oersteds or greater in combination with an energy input from a radio-frequency coil which is operated at a frequency of from 100 kilocycles to 1 megacycle per second and which has a peak magnetic field component strength of up to 2 oersteds will trigger and sustain a satisfactory glow discharge.

Due to the low temperatures which are maintained according to the present process and the absence of local arcing, no spattering, sputtering or the like is experienced. Also, the collimating effect of the magnetic field minimizes random deposition of polymer on the walls of the chamber, concentrates the deposition on the substrate and reduces "shadowing."

The use of the magnetic field to confine the plasma also results in great efficiency in terms of film growth rate per power expended. As seen in FIGURE 2, film growth rates of 1600 A. per minute have been achieved with very little substrate heating or shadowing of the polymer films.

The present controlled glow discharge for plasma formation and deposition may be used to deposit thin, uniform insulating films in the manufacture of thin film capacitors, the plates of which are evaporated metal films. Insulating films as thin as 100 A. may also be produced from a number of different organic monomers. The magnetically focused glow discharge also permits greater control of the nature of the polymer film, yields a much more homogeneous film and especially permits control of the thickness and dimensions of the deposited film.

While the present invention has been described with reference to certain preferred embodiments, it will be apparent to those skilled in the art that various modifications may be made in both the method and apparatus without departing from the spirit of the invention or from the scope of the following claims.

What is claimed is:

1. A method for depositing polymer films onto a substrate comprising:
   confining monomer vapors and a substrate in a chamber, subjecting said monomer vapors to a radio-frequency electromagnetic field having a peak magnetic field component of up to about 2 oersteds,
   simultaneously subjecting said monomer vapors to a D.C. magnetic field having a strength of at least about 300 oersteds and formed to confine said monomer vapors, confining of said monomer vapors increasing the probability of collision between particles therein to produce a glow discharge and to form a plasma, and
   contacting said substrate with said plasma to effect condensation of said plasma onto said substrate in the form of a polymerized film.

2. A method for depositing polymer films onto a substrate comprising:
   confining monomer vapors and a substrate in a chamber, subjecting monomer vapors in one portion of said chamber to a radio-frequency electromagnetic field having a peak magnetic field component of up to about 2 oersteds,
   simultaneously subjecting said monomer vapors in said one portion of said chamber to a D.C. magnetic field having a strength of at least about 300 oersteds and formed to confine said monomer vapors, confining of said monomer vapors increasing the probability of collision between particles therein to produce a glow discharge and to form a plasma,
   subjecting said plasma to a secondary localized magnetic field to propel said plasma towards said substrate located in another portion of said chamber, and
   contacting said substrate with said plasma to condense said plasma onto said substrate in the form of a polymerized film.

3. A method for depositing a polymer film on a substrate comprising the steps of introducing monomer vapors at a given pressure into a chamber, generating and subjecting said monomer vapors in one portion of said chamber to radio-frequency electromagnetic energy insufficient, of itself, to excite a glow discharge in said monomer vapors at said given pressure, generating and simultaneously subjecting said monomer vapors in said one portion of said chamber to a magnetic field, forming said magnetic field to confine charge particles in said monomer vapors and increase the probability of collisions between particles of said monomer vapors in said one portion of said chamber, said electromagnetic energy and said magnetic field cooperating to excite said glow discharge and produce a plasma in said monomer vapors positioning a substrate in said chamber, and contacting said plasma with the surface of said substrate so as to deposit thereon a polymer film.

4. A method for forming a polymer film on a substrate comprising the steps of introducing monomer vapors into a chamber at a given pressure, generating and subjecting said monomer vapors in one portion of said chamber to radio-frequency electromagnetic energy insufficient to sustain a glow discharge in said monomer vapors at said given pressure, generating and simultaneously subjecting said monomer vapors in said one portion of said chamber to a magnetic field, forming said magnetic field to confine and thereby increase the probability of collisions between particles of said monomer vapors in said portion of said one chamber sufficiently to sustain a glow discharge and produce a plasma in said monomer vapors, positioning a substrate within said chamber, and contacting said plasma with the surface of said substrate so as to deposit thereon a polymer film.

5. The method as defined in claim 15 including the further step of locating means for generating said radio-frequency electromagnetic energy and said magnetic field exterior to and along an axis of said chamber, said axis passing through said one portion of said chamber.

6. The method as defined in claim 15 including the further step of positioning said substrate at another portion of said chamber, and propelling said plasma when produced from said one portion to said another portion of said chamber so as to contact the surface of said substrate.

7. The method as defined in claim 4 including the further step of selecting said monomer vapors from the group consisting of styrene, divinylbenzene, butadiene, glycidyl methacrylate, allyl glycidyl, ethylene, and propylene.

8. The method as defined in claim 4 including the further step of introducing vapors of an epoxy monomer material into said chamber to create said plasma.

9. The method as defined in claim 4 including the further step of introducing vapors of an alkylenic material into said chamber to create said plasma.

10. The method as defined in claim 4 including the further steps of introducing said monomer vapors into a first portion of said chamber, positioning said substrate in a second portion of said chamber, said plasma being produced in said one portion of said chamber intermediate said first and said second portions, and maintaining a pressure differential between said first and said second portions of said chamber to propel said plasma toward said second portion to contact the surface of said substrate.

11. The method as defined in claim 4 including the further steps of introducing said monomer vapors into a first portion of said chamber, positioning said substrate in a second portion of said chamber, said plasma being produced in said one portion of said chamber intermediate said first and said second portions, and generating and applying a magnetic field of nonuniform intensity along said one portion of said chamber to propel said plasma toward said second portion to contact the surface of said substrate.

12. The method as defined in claim 4 including the further steps of introducing said monomer vapors into a first portion of said chamber, positioning said substrate in a second portion of said chamber, said plasma being produced in said one portion of said chamber intermediate said first and said second portions, and generating and applying magnetic fields of nonuniform intensity along said one portion of said chamber while maintaining a pressure differential between said first and said second portions of said chamber to propel said plasma toward said second portion to contact the surface of said substrate.

13. A method for depositing a polymer film on a substrate surface comprising the steps of introducing monomer vapors at a given pressure at one end of a chamber having a first axis, positioning a substrate having a surface incident to said first axis at an opposite end of said chamber, supplying a radio-frequency signal to a first coil and a direct-current signal to a second coil positioned about said chamber and arranged coaxially with respect to said first axis along an intermediate portion of said chamber so as to subject said monomer vapors along said intermediate portion of said chamber concurrently to electromagnetic energy and a magnetic field said electromagnetic energy being insufficient, of itself, to excite and sustain a glow discharge in said monomer vapors at said given pressure, the combined effect of said electromagnetic energy and said magnetic field being to excite and sustain a glow discharge and produce a plasma in said monomer vapors, and contacting said plasma with said substrate surface to deposit thereon a polymer film.

14. The method as defined in claim 13 including the further step of maintaining a pressure differential between said one end and said opposite end of said chamber to propel said plasma along said first axis to contact said substrate surface.

15. The method as defined in claim 13 including the further step of supplying a direct-current signal to a third coil arranged coaxially with said first and second coils along said intermediate portion of said chamber adjacent said one end so as to subject said monomer vapors along said intermediate portion of said chamber to a nonuniform magnetic field and propel said plasma along said first axis to contact said substrate surface.

16. The method as defined in claim 14 including the further step of positioning a pattern-defining mask over said substrate surface to intercept portions of said plasma and define a patterned polymer film on said substrate surface.

17. The method as defined in claim 15 including the further step of positioning a pattern-defining mask over said substrate surface to intercept portions of said plasma and define a patterned polymer film on said substrate surface.

References Cited by the Examiner

UNITED STATES PATENTS

| | | | |
|---|---|---|---|
| 2,450,503 | 10/1948 | Drummond | 117—106 X |
| 2,876,133 | 3/1959 | Iler et al. | 117—106 X |
| 3,117,022 | 1/1964 | Bronson et al. | 117—106 X |

MURRAY KATZ, *Primary Examiner.*